United States Patent
Bisht (10) Patent No.: US 9,268,699 B2
(45) Date of Patent: Feb. 23, 2016

(54) DYNAMIC CACHE ALLOCATION IN A SOLID STATE DRIVE ENVIRONMENT

(71) Applicant: Samsung Electronics Co., Ltd., Suwon-si (KR)

(72) Inventor: Pradeep Bisht, Mountian View, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 286 days.

(21) Appl. No.: 13/909,045

(22) Filed: Jun. 3, 2013

(65) Prior Publication Data

US 2014/0359224 A1    Dec. 4, 2014

(51) Int. Cl.
*G06F 12/08*  (2006.01)
*G06F 9/44*  (2006.01)
*G06F 1/32*  (2006.01)

(52) U.S. Cl.
CPC .......... *G06F 12/0848* (2013.01); *G06F 1/3203* (2013.01); *G06F 9/4418* (2013.01); *G06F 2212/222* (2013.01)

(58) Field of Classification Search
None
See application file for complete search history.

(56) References Cited

U.S. PATENT DOCUMENTS

| | | | |
|---|---|---|---|
| 7,072,989 B1* | 7/2006 | Kolokowsky et al. | 710/8 |
| 8,694,814 B1* | 4/2014 | Salomon et al. | 713/323 |
| 2009/0024843 A1* | 1/2009 | Choi | 713/2 |
| 2009/0327608 A1* | 12/2009 | Eschmann et al. | 711/118 |
| 2010/0174934 A1* | 7/2010 | Zhao et al. | 713/324 |
| 2010/0262849 A1* | 10/2010 | Chan et al. | 713/320 |
| 2011/0231595 A1* | 9/2011 | Wakrat et al. | 711/103 |
| 2012/0079258 A1* | 3/2012 | Schneider et al. | 713/1 |
| 2012/0102347 A1* | 4/2012 | Hobson | 713/323 |
| 2012/0284551 A1* | 11/2012 | Zhao et al. | 713/323 |
| 2013/0212317 A1* | 8/2013 | Traister et al. | 711/103 |

\* cited by examiner

*Primary Examiner* — Kaushikkumar Patel
(74) *Attorney, Agent, or Firm* — Renaissance IP Law Group LLP (57) ABSTRACT

An invention is provided for dynamic cache allocation in a solid state drive environment. The invention includes partitioning a cache memory into a reserved partition and a caching partition, wherein the reserved partition begins at a beginning of the cache memory and the caching partition begins after an end of the reserved partition. Data is cached starting at a beginning of the caching partition. Then, when the caching partition is fully utilized, data is cached the reserved partition. After receiving an indication of a power state change, such as when entering a sleep power state, marking data is written to the reserve partition. The marking data is examined after resuming the normal power state to determine whether a deep sleep power state was entered. When returning from a deep sleep power state, the beginning address of valid cache data within the reserve partition is determined after resuming a normal power state.

17 Claims, 7 Drawing Sheets

DYNAMIC CACHE ALLOCATION IN A SOLID STATE DRIVE ENVIRONMENT

BACKGROUND OF THE INVENTION

1. Field of the Invention

This invention relates generally to disk caching, and more particularly to dynamic cache allocation in a solid stage drive environment.

2. Description of the Related Art

Today, mobile computing allows individuals the freedom to utilize the processing power of computers anywhere it is needed. Using mobile computing devices, such as laptops and notebooks, users are able to take their projects with them whenever they leave their normal computing environment such as their home or office. To enable such freedom, power consumption by these mobile computing devices must be reduced to enable longer operating times away from permanent power sources.

One solution for power conservation is the use of various power states based on computing use. For example, when a system is idle for a predetermined period of time, the system can enter a standby, or sleep power state. In the sleep power state, the system turns off power to peripherals, such as the keyboard, mouse and the hard drive. However, to save the current state of the computing device, power is still supplied to the RAM, enabling the system to hold the current state in memory. Upon an event indicating the end of the idle period, such as a keyboard use or mouse use, the system resumes from the sleep power state, supplying power back to peripherals and resuming normal operation.

However, although much reduced, the sleep power state still consumes power in order to save the system state in RAM. To further save power, a system can enter a hibernation power state, wherein the system state is saved to non-volatile memory. When entering the hibernation state, the contents of the RAM is saved to non-volatile memory and power is turned off in the entire system. Upon resuming, the RAM contents is loaded back into RAM from the non-volatile memory and normal operation continues.

Although the hibernation power state saves power, resuming from the hibernation state requires an increased period of time over resuming from a sleep power state, particularly when the non-volatile memory used to save the system state is a hard disk drive. To address this issue, Intel Fast Flash Standby (iFFS) has been developed. iFFS saves the system state on a solid state drive (SSD) and further introduces a sleep state prior to entering an iFFS-hibernation state. Together, these improvements decrease the time required to resume after the system has been idle and power savings modes have been entered.

Figure 1:
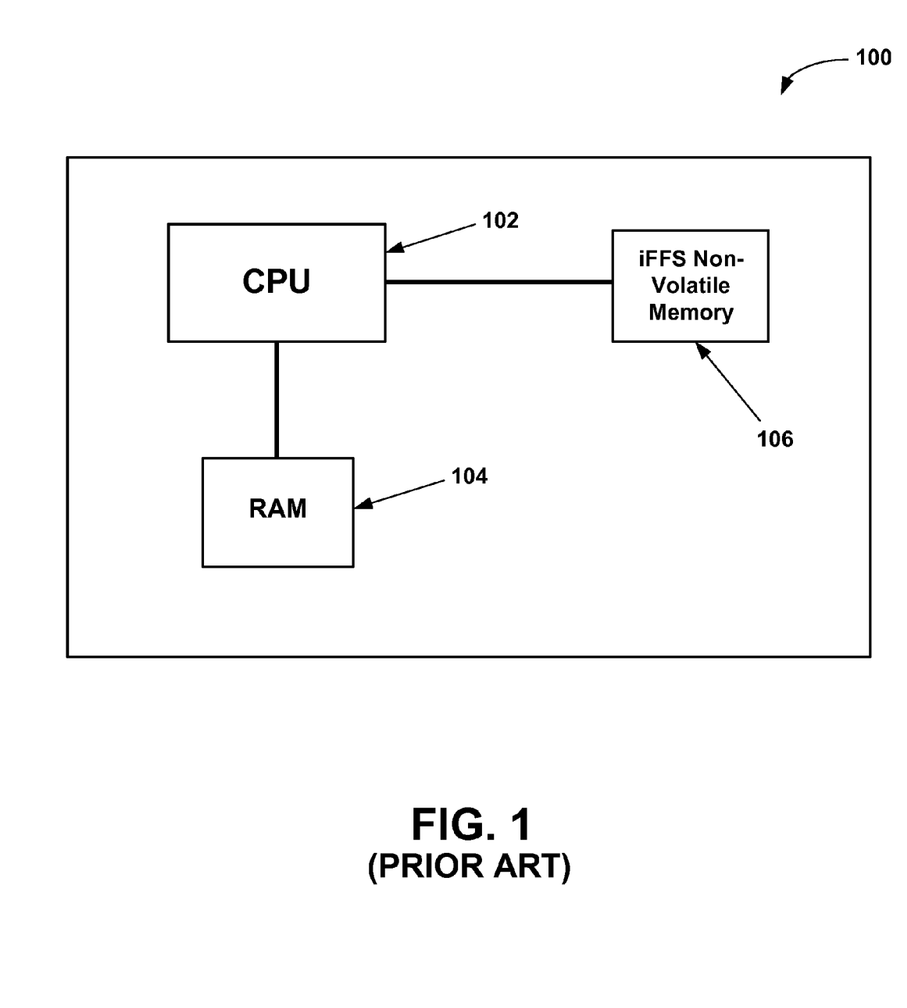
FIG. 1 is a block diagram showing a prior art iFFS based computer system.

FIG. 1 is a block diagram showing a prior art iFFS based computer system 100. The iFFS based computer system includes a central processing unit (CPU) in communication with system RAM 104 and an iFFS non-volatile memory 106. The iFFS non-volatile memory 106 is an SSD that has the same storage capacity as the RAM 104 and is dedicated to storage of the RAM contents upon hibernation. When the system 100 is idle for a predetermined period of time, the system enters a sleep power mode, wherein power is still supplied to the RAM 104, however all other peripherals are turned off.

After a predetermined period of time, if the system 100 remains idle it enters an iFFS-hibernation power state. When the system 100 enters the iFFS-hibernation power state, the contents of the RAM 104 is written to the iFFS non-volatile memory 106 and power is turned off in the entire system 100.

Later, upon resume, the RAM data stored in the iFFS non-volatile memory 106 is loaded back into the RAM 104 and the system 100 resumes normal operation. Since the iFFS non-volatile memory 106 is an SSD, the period of time need to complete resume is greatly decreased.

Caching has long been used in storage environments to enhance the performance of slower storage devices, such as disk drives. In caching, a smaller and faster storage medium is utilized to temporarily store and retrieve frequently used data, while the larger and typically slower mass storage medium is used for long term storage of data. However, using the SSD of the iFFS non-volatile memory can lead to data loss for the cache and/or wasted SSD storage.

In view of the foregoing, there is a need for systems and methods that allow SSD based caching in an iFFS environment. The methods should allow full iFFS functionality without wasting expensive SSD memory. Moreover, the methods should provide a means to fully utilized memory for caching, yet account for any data loss as a result of iFFS based hibernation use.

SUMMARY OF THE INVENTION

Broadly speaking, embodiments of the present invention address these needs by providing a process for dynamic allocation of cache in a solid stage drive environment. In one embodiment, a method for dynamic allocation of cache in a solid state drive environment is disclosed. The method includes partitioning a cache memory into a reserved partition, also referred to as RAM save partition, and a caching partition, also referred to as a general read cache partition. The reserved partition begins at the beginning of the cache memory and the caching partition begins after the end of the reserved partition. Data is cached starting at the beginning of the caching partition. Then, when the caching partition is fully utilized, data is cached in the reserved partition. After receiving an indication of a power state change, such as when entering a sleep power state, marking data is written to the reserve partition. The marking data is examined after resuming the normal power state to determine whether a deep sleep power state was entered. When returning from a deep sleep power state, the beginning address of valid cache data within the reserve partition is determined after resuming a normal power state.

In a further embodiment, a system is disclosed for dynamic allocation of cache in a solid state drive environment. The system includes a central processing unit (CPU), a system memory in communication with the CPU, a target storage device in communication with the CPU, and a dynamic caching device having a cache memory partitioned into a reserved partition and a caching partition. As above, the reserved partition begins at the beginning of the cache memory and the caching partition begins after the end of the reserved partition. In operation, read data is cached starting at the beginning of the caching partition, and further cached using the reserved partition when the caching partition is fully utilized. Similar to above, marking data is written to the reserve partition after receiving an indication of a power state change. The marking data is examined after resuming a normal power state to determine whether a deep sleep power state was entered, and the beginning address within the reserve partition having valid cache data is determined.

A further method for dynamic allocation of cache in a solid state drive environment is disclosed in an additional embodiment. The method includes partitioning a cache memory into a reserved partition and a caching partition, wherein the reserved partition begins at the beginning of the cache memory and the caching partition begins immediately after the end of the reserved partition. As above, the method includes caching data starting at the beginning of the caching partition, and caching data using the reserved partition when the caching partition is fully utilized. After receiving an indication of a power state change, marking data is written to the reserve partition. For example, the marking data can include writing all zeros to the first page of the reserved partition. Then, after resuming a normal power state the marking data is examined to determine whether a deep sleep power state was entered. The method further comprises determining the beginning address within the reserve partition having valid cache data after resuming a normal power state. To accomplish this task a page of each data block in the reserve partition is examined sequentially until valid cache data is found, which occurs when the page of data matches the corresponding page of data on the target storage device. Generally, the same page of data is examined in each data block, for example, the page of data can be the first page of data of each data block. Optionally, invalid cache data within the reserved partition can be repopulated after resuming a normal power state based on corresponding data stored on the target storage device. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for dynamic cache allocation in an SSD caching environment. In general, embodiments of the present invention partition the cache into at least two partitions: a RAM save partition and a general read cache partition located after the RAM save partition. When the end of the general read cache partition is reached, embodiments of the present invention begin using the RAM save partition, which starts at the beginning of cache memory. The contents of the RAM is written to the RAM save partition upon entering the deep sleep state. Then, upon resuming from deep sleep, embodiments of the present invention determine how much of the RAM save partition still contains valid cache data that can still be used during normal caching operations. Optionally, the overwritten portion of the RAM save partition of the cache can be repopulated.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 2:
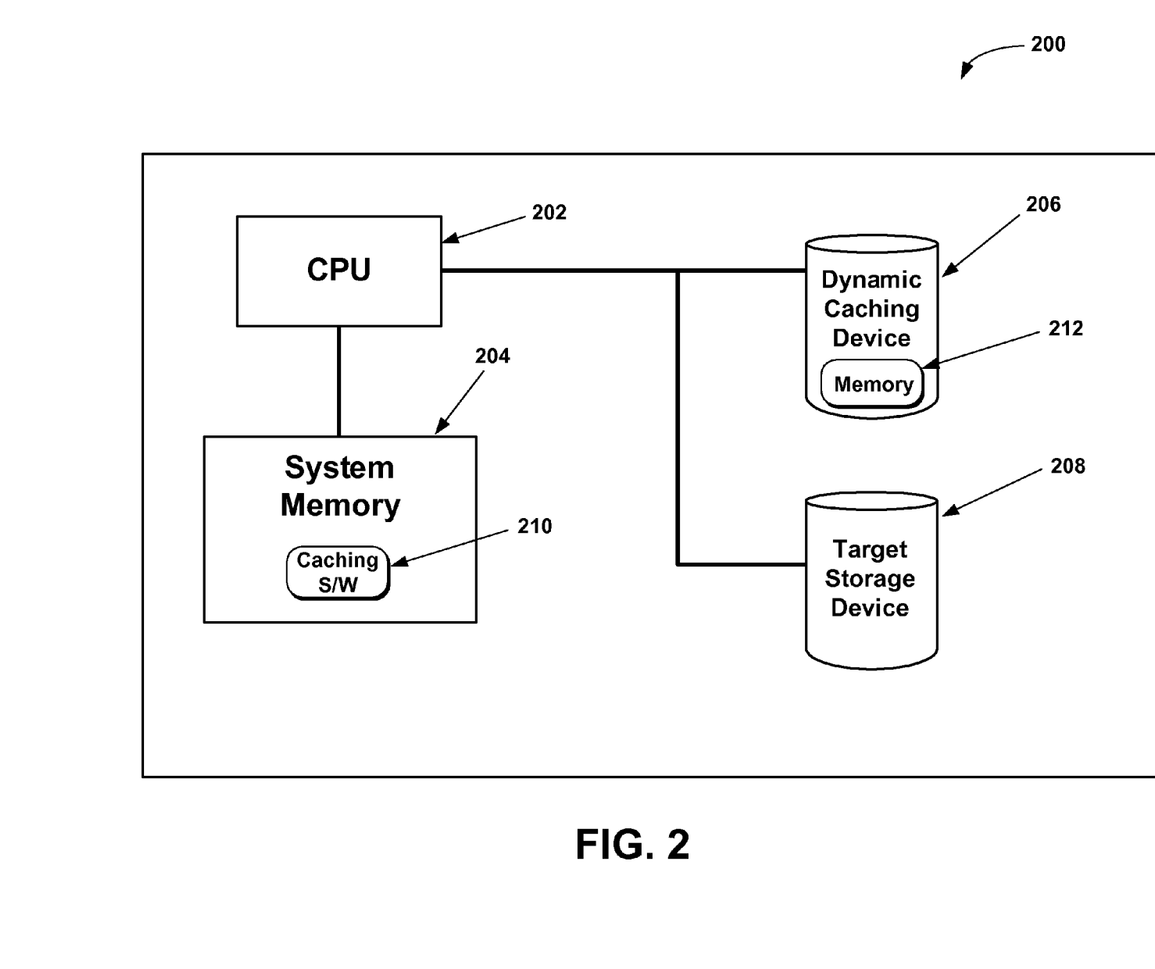
FIG. 2 is a block diagram showing an exemplary computer system having a dynamic cache allocation solid state drive caching environment, in accordance with an embodiment of the present invention.

FIG. 2 is a block diagram showing an exemplary computer system 200 having a dynamic cache allocation solid state drive caching environment, in accordance with an embodiment of the present invention. The computer system 200 includes a central processing unit (CPU) 202 connected to system memory 204, a dynamic caching device 206, and a target storage device 208, such as a hard disk drive. During operation, caching software 210 is loaded into system memory 204 to facilitate caching functionality on the computer system 200.

Generally, the dynamic caching device 206 is a smaller and faster access drive than that used for the target storage device 208. For example, the dynamic caching device 206 can be a solid state drive (SSD) such as NAND flash based SSD or phase change memory (PCM). Because of the enhance speed of the caching device 206, reads and writes directed to the dynamic caching device 206 are processed much faster than is possible using the target storage device 208. Caching takes advantage of these differences by reading from the dynamic caching device 206 instead of the target storage device 208 when the requested data is stored on the dynamic caching device 206. To enhance resume time after deep sleep, embodiments of the present invention share the caching device 206 between normal caching functionality and iFFS functionality.

As mentioned above, there are several power states that can apply to a personal computer system. Power state S0 is the normal operational state, wherein peripherals, RAM, and storage devices are powered and available for use. When the system is idle for a predetermined period of time, the system generally enters power state S3, which is referred to as sleep mode. In the S3 power state the system cuts power to unneeded subsystems and places the RAM into a minimum power state sufficient to retain data. Hence, the RAM is still powered, however, peripherals and storage devices are not powered. The system can be brought out of sleep mode by a wake-up event, such as the user pressing on the power button or via the use of an attached keyboard or mouse.

If the system is not bought out of sleep mode, then after a predetermined period of time, the system enters power state S4, which is referred to as deep sleep mode. In the S4 power state the contents of the RAM is saved to a non-volatile memory and power is tuned off completely in the system. Since embodiments of the present invention share the caching device during deep sleep mode, the contents of the RAM is written to the caching device. For example, in FIG. 2, when the CPU 202 determines that the system 200 will enter deep sleep mode (S4), the contents of the system memory 204 is written to the dynamic caching device 206. To facilitate this functionality, embodiments of the present invention logically divide the dynamic cache memory 212 into two partitions: a RAM save partition and a general read cache partition.

Figure 3:
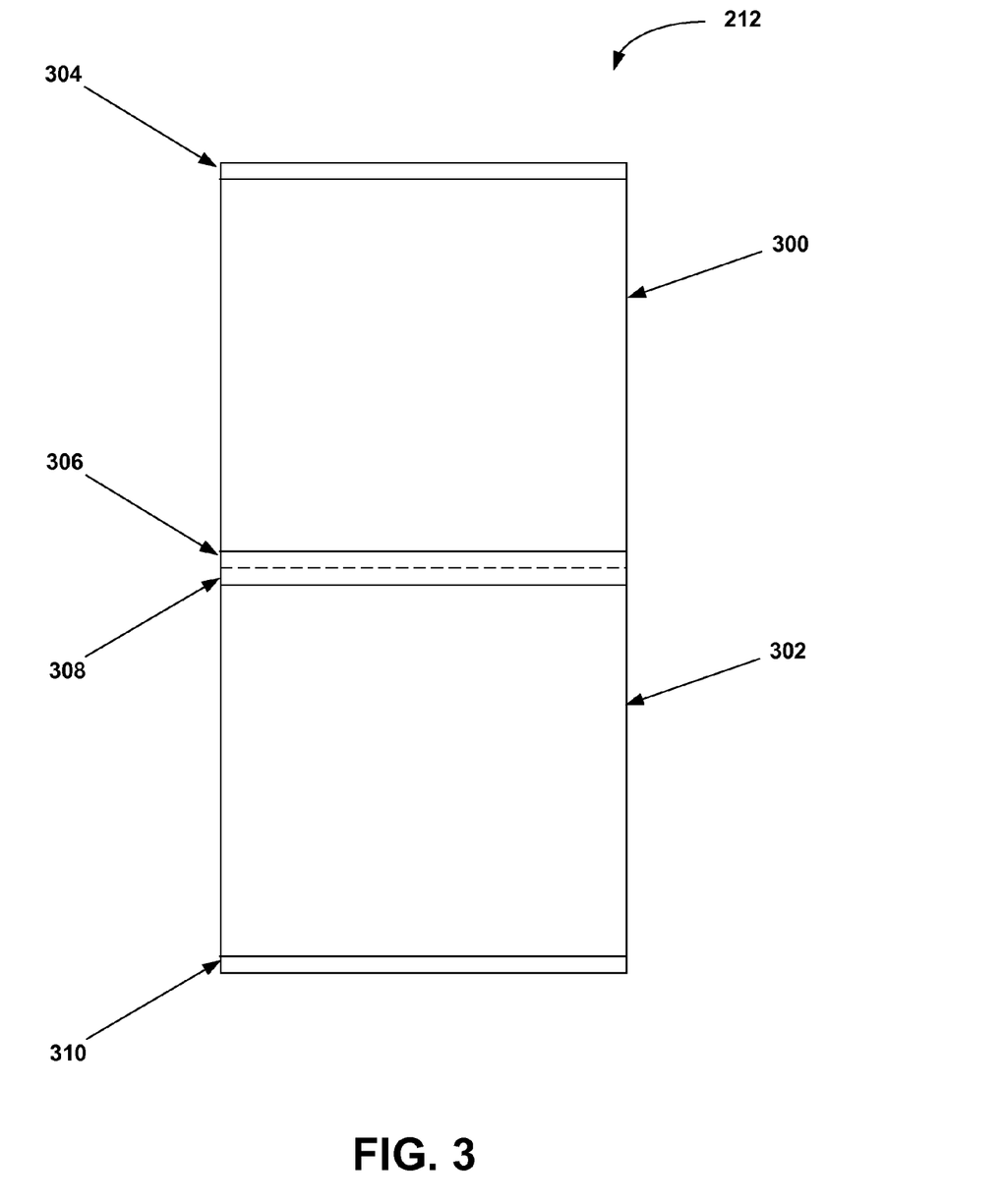
FIG. 3 is a logical block diagram showing the memory allocation of the dynamic cache memory, in accordance with an embodiment of the present invention.

FIG. 3 is a logical block diagram showing the memory allocation of the dynamic cache memory 212, in accordance with an embodiment of the present invention. As illustrated in FIG. 3, the dynamic cache memory 212 is logically partitioned into a RAM save partition 300 and a general read cache partition 302. The RAM save partition 300 begins at the first address of the dynamic cache memory 212, indicated in FIG. 3 at 304. Generally, the size of the RAM save partition 300 is chosen so as to accommodate a worst case scenario wherein the entire system RAM is being used when the system enters hibernation mode. For example, in one embodiment the RAM save partition 300 can be the same size as the system DRAM.

The general read cache partition 302 begins after the RAM save partition 300. For example, in FIG. 3 the RAM save partition 300 begins at the start of the dynamic cache memory 212 at 304, and ends at 306. The general read cache partition 302 begins at 308, which is immediately after the end 306 of the RAM save partition 300. The general read cache partition 302 ends at the end of the dynamic cache memory 212, indicated at 310. When the system enters hibernation mode, the contents of the RAM is saved to the RAM save partition 300. However, during normal operation, the entire dynamic cache memory 212 is utilized for read cache functionality beginning with the general read cache partition 302.

More specifically, embodiments of the present invention begin read caching starting at the beginning 308 of the general read cache partition 302, which as described above is located after the RAM save partition 300. It should be noted that cached data located within the general read cache partition 302 will not be overwritten by the RAM data when the system enters deep sleep because the general read cache partition 302 is located after the RAM save partition 300. Generally, the beginning of the general read cache partition 302 includes important read data such as boot data, commonly used application executable files, and dynamic link library (DLL) files. In this manner, these important files naturally reside in the general read cache partition 302 and are not overwritten during hibernation. Embodiments of the present invention continue to cache read data using the general read cache partition 302 until the end of the dynamic caching memory 212 is reached, indicated at 310.

Once the end of the dynamic caching memory 212 is reached, indicated at 310, embodiments of the present invention continue to cache read data starting at the beginning of the RAM save partition 300, indicated at 304, and continue caching data until the end of the RAM save partition 300 is reached, indicated at 306. In some embodiments, the first page of the RAM save partition 300 can be used for various cache management functions and thus, in some embodiments, may not include cached read data. In this manner, embodiments of the present invention generally utilize the entire dynamic cache memory 212 during normal operation. Once the entire dynamic cache memory 212 is utilized, additional caching can occur via the use of predetermined replacement policies to select cached data to discard for additional caching utilization. The above described operational flow continues until a sleep mode trigger is detected. The sleep mode trigger can be any signal from the system indicating that sleep mode is about to start.

Once the sleep mode trigger is detected, embodiments of the present invention write marking data to the first page of the RAM save partition 300 to indicate the system has entered sleep mode. In one embodiment, the first page of the RAM save partition 300 is filled with zeros to indicate the system has entered sleep mode. When the system resumes from sleep mode, the first page of the RAM save partition 300 is examined to determine if it is still marked, that is contains all zeros, in the above embodiment. If the page contains all zeros, the system has resumed from sleep mode but has not entered deep sleep mode. As a result, all the cached data located within the RAM save partition 300 is still valid and can be utilized after resuming from sleep.

However, if the first page of the RAM save partition 300 does not include all zeros, this indicates that the system entered deep sleep mode and some, or all, of the data located within the RAM save partition is invalid. More specifically, if the system is not bought out of sleep mode after a predetermined period of time the system enters power state S4, which is deep sleep mode. In the S4 power state the contents of the RAM is saved to a non-volatile memory and power is tuned off completely in the system. Since embodiments of the present invention share the caching device during deep sleep mode, the contents of the RAM is written to the RAM save partition 300 of the dynamic caching memory 212 starting at the first page of the RAM save partition 300, indicated at 304. Thus, if the system enters deep sleep mode, the first page 304 of the RAM save partition 300 will be overwritten with RAM save data and no longer contain all zeros.

Figure 4:
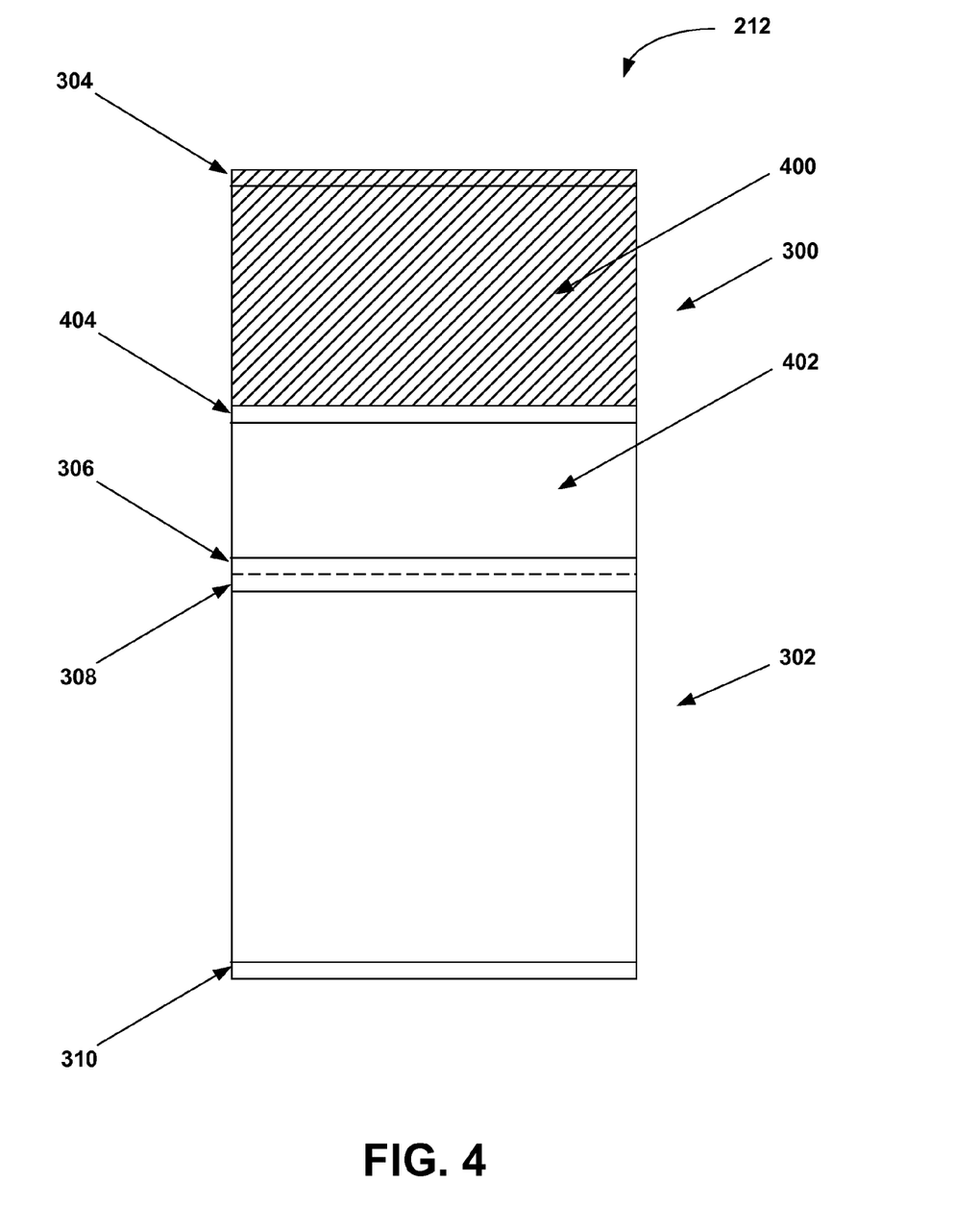
FIG. 4 is a logical block diagram showing the memory allocation of the dynamic cache memory after deep sleep mode, in accordance with an embodiment of the present invention.

FIG. 4 is a logical block diagram showing the memory allocation of the dynamic cache memory 212 after deep sleep mode, in accordance with an embodiment of the present invention. Similar to FIG. 3, the dynamic cache memory 212 is logically partitioned into a RAM save partition 300 and a general read cache partition 302. The RAM save partition 300 begins at the first address of the dynamic cache memory 212, indicated at 304, and ends at 306. The general read cache partition 302 begins after the RAM save partition 300, at 308, and ends at the end of the dynamic cache memory 212, indicated at 310.

When the system enters the deep sleep state, the contents of the RAM is saved to the RAM save partition 300 as a RAM save file 400. However, the size of RAM save file 400 is based on the current contents of the RAM at the moment the deep sleep state is entered. As such, if the entire contents of the RAM is not being utilized at the moment of deep sleep, the RAM save file 400 will be smaller than the RAM save partition 300 because the size of the RAM save partition 300 is based on the entire capacity of the RAM. As a result, if the RAM save file 400 is smaller than then RAM save partition 300, valid read cache data 402 will remain in the RAM save partition 300 after resume.

Embodiments of the present invention find the remaining valid cache data 402 by searching for a page match in the RAM save partition after resume. More particularly, embodiments of the present invention read the first page of each block in the RAM save partition 300 and compare it against the corresponding contents on the target storage device. If the page compare does not match, at least part of the block was overwritten by the RAM save file 400, and the block will be recycled. However, if the page compare is a match, the block was not overwritten by the RAM save file 400 and contains valid read cache data. Moreover, because the RAM save file 400 is always written sequentially starting from the beginning of the RAM save partition 300, at 304, all the blocks after the matching block also include valid read cache data.

For example, in FIG. 4, the RAM save file 400 was written to the RAM save partition 300 for deep sleep, overwriting a plurality of blocks in the RAM save partition 300. Upon resume, the RAM save file 400 is read back into RAM to return the system to the same state it had prior to deep sleep. At this point, embodiments of the present invention read the first page 304 of the RAM save partition 300 to determine whether the system entered deep sleep mode. In the example of FIG. 4, the system has entered deep sleep mode and as a result the first page 304 of the RAM save partition 300 is not still marked, that is, does not contain all zeros. As a result, the caching software determines that a RAM save file 400 has overwritten a portion of the read cache data stored in the RAM save partition 300 and begins to determine where the valid cache data 402 remaining in the RAM save partition 300 begins, as described above. In the example of FIG. 4, the first matching page 404 is found and thus, the caching software determines that the matching page 404 and all blocks between the matching page 404 and the end of the RAM save partition 300 contain valid cache data.

Figure 5:
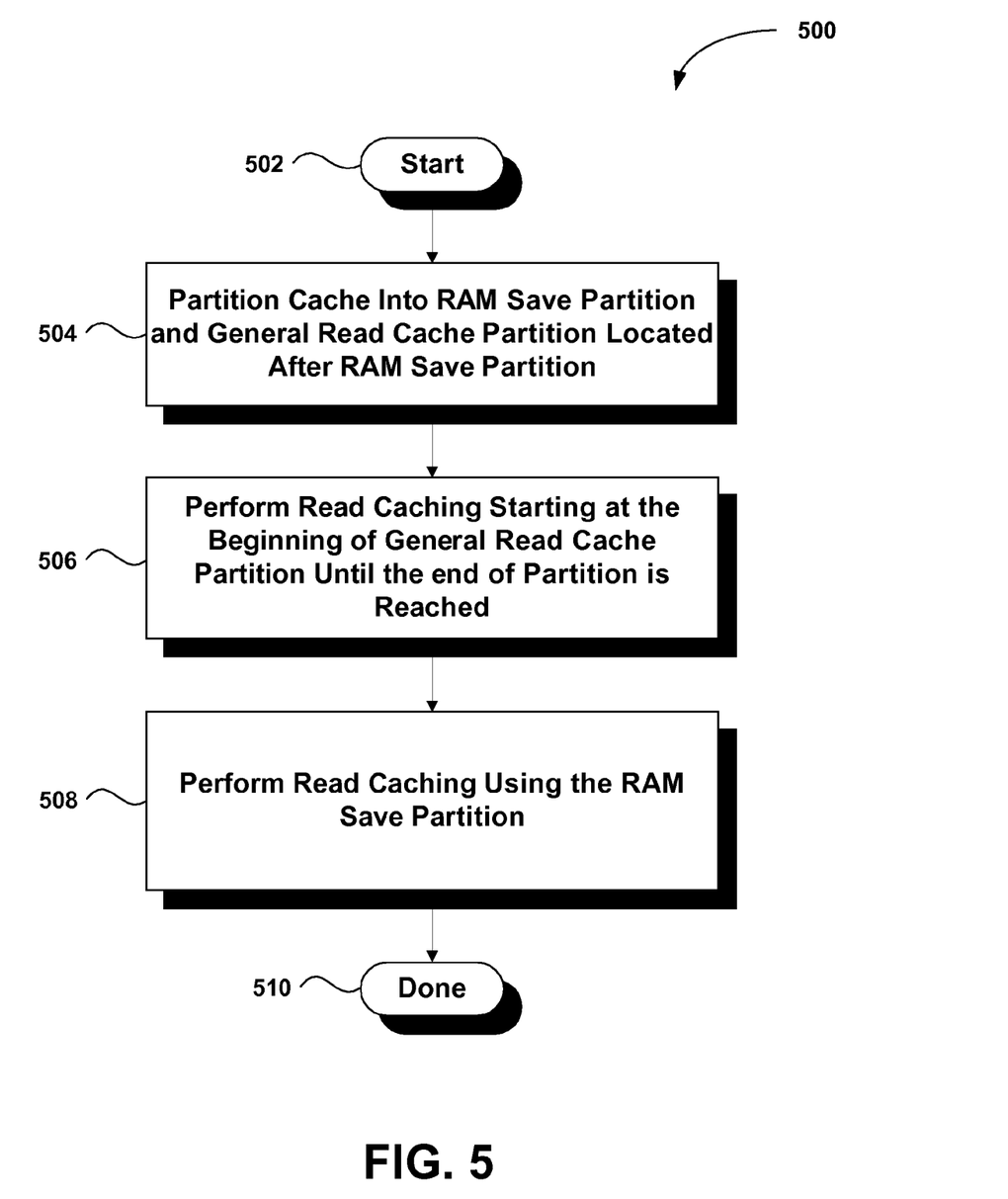
FIG. 5 is a flowchart showing a method for dynamic cache allocation of solid state drive volume, in accordance with an embodiment of the present invention.

FIG. 5 is a flowchart showing a method 500 for dynamic cache allocation of solid state drive volume, in accordance with an embodiment of the present invention. In an initial operation 502, preprocess operations are performed. Preprocess operations can include, for example, selecting the size of the caching device, loading caching software into memory, and other preprocess operations that will be apparent to those skilled in the art after a careful reading of the present disclosure.

In operation 504, the dynamic cache memory is partitioned into a RAM save partition and a general read cache partition. The RAM save partition begins at the first address of the dynamic cache memory. Generally, the size of the RAM save partition is chosen so as to accommodate a worst case scenario wherein the entire system RAM is being used when the system enters hibernation mode. The general read cache partition begins after the RAM save partition and ends at the end of the dynamic cache memory.

Normal read caching is performed in operation 506. Embodiments of the present invention begin read caching starting at the beginning of the general read cache partition, which is located after the RAM save partition. Because the general read cache partition is located after the RAM save partition, the general read cache partition will not be overwritten by the RAM data when the system enters deep sleep. As such, the beginning of the general read cache partition includes important read data such as boot data, commonly used application executable files, and dynamic link library (DLL) files. In this manner, these important files naturally reside in the general read cache partition and are not overwritten during deep sleep. Embodiments of the present invention continue to cache read data using the general read cache partition until the end of the dynamic caching memory is reached.

In operation 508, read caching is performed using the RAM save partition. Once the end of the dynamic caching memory is reached, embodiments of the present invention continue to cache read data starting at the beginning of the RAM save partition and continue caching data until the end of the RAM save partition is reached. In some embodiments, the first page of the RAM save partition can be used for various cache management functions and thus, in some embodiments, may not include cached read data. In this manner, embodiments of the present invention generally utilize the entire dynamic caching memory during normal operation. Once the entire dynamic caching memory is utilized, additional caching can occur via the use of predetermined replacement policies to select cached data to discard for additional caching utilization.

The process ends in operation 510. At anytime during the operations of method 500, embodiments of the present invention may detect a sleep mode trigger indicating the system is about to enter power state S3, sleep mode. When a sleep mode trigger is detected, embodiments of the present invention prepare for power state S3 using a dynamic cache sleep mode preparation process, as described next with reference to FIG. 6.

Figure 6:
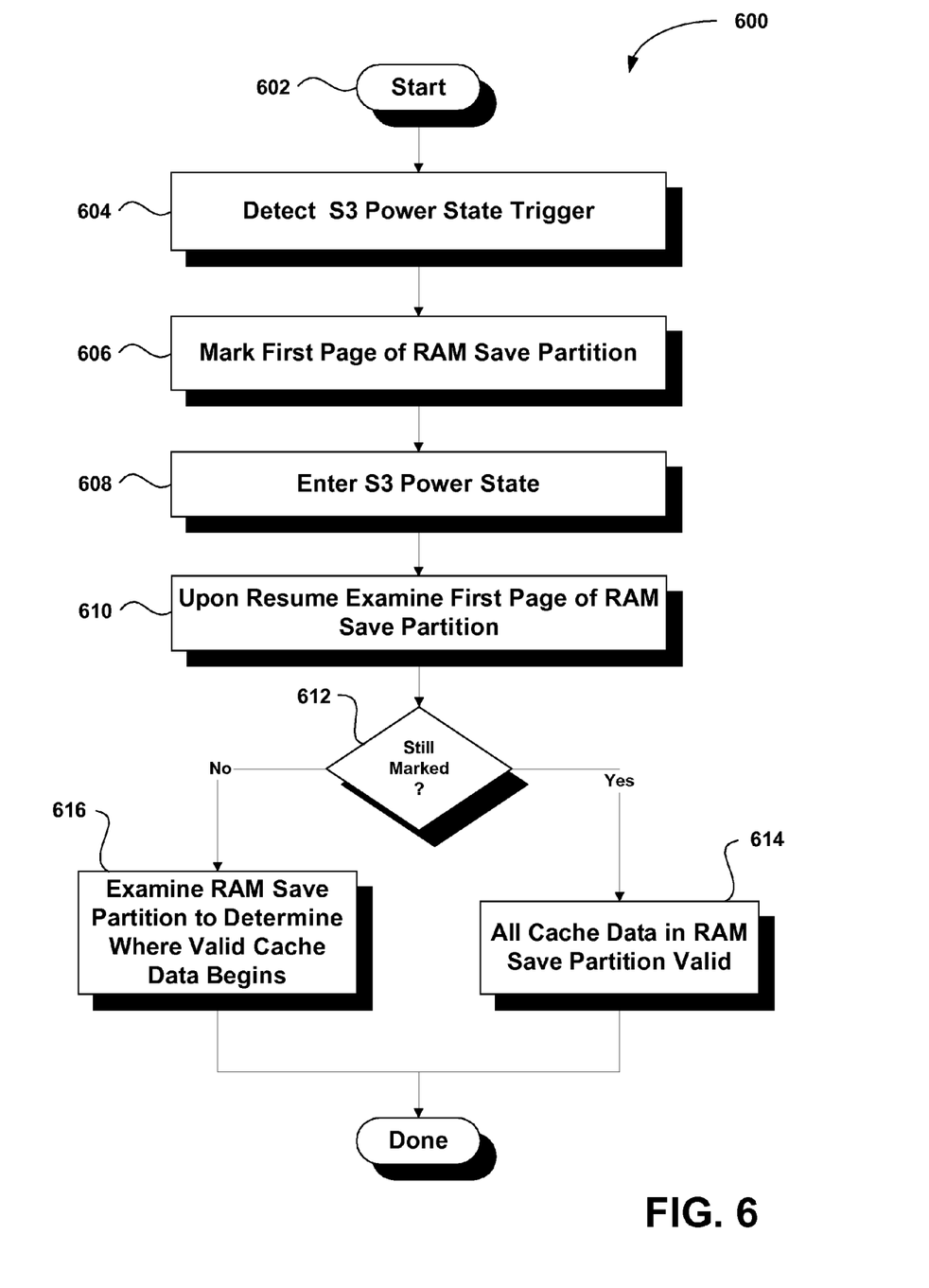
FIG. 6 is a flowchart showing a sleep mode preparation process, in accordance with an embodiment of the present invention.

FIG. 6 is a flowchart showing a sleep mode preparation process 600, in accordance with an embodiment of the present invention. In an initial operation 602, preprocess operations are performed. Preprocess operations can include, for example, partitioning the dynamic cache into a RAM save partition and general read cache partition, performing read caching operations using both partitions, and other preprocess operations that will be apparent to those skilled in the art after a careful reading of the present disclosure.

In operation 604, an S3 power state trigger is detected. As mentioned above, the operations described in FIG. 5 continue until a sleep mode trigger is detected, which can be any signal from the system indicating that sleep mode is about to start. When a sleep mode trigger is detected, embodiments of the present invention prepare for power state S3.

In operation 606, the first page of the RAM save partition is marked. Once the sleep mode trigger is detected, embodiments of the present invention mark the first page of the RAM save partition to indicate the system has entered sleep mode. In one embodiment, the first page of the RAM save partition is filled with zeros to indicate the system has entered sleep mode. Marking the first page of the RAM save partition allows embodiments of the present invention to determine whether the system entered deep sleep mode (S4) after the S3 power state, as described in greater detail subsequently.

Once the first page of the RAM save partition is marked, the system enters power state S3, sleep mode, in operation 608. When the system is idle for a predetermined period of time, the system generally enters power state S3, sleep mode. In the S3 power state the system cuts power to unneeded subsystems and places the RAM into a minimum power state sufficient to retain data. If the system is not bought out of sleep mode after a predetermined period of time, the system enters power state S4, deep sleep mode. In the S4 power state the contents of the RAM is saved to the RAM save partition of the dynamic caching memory and power is tuned off completely in the system.

Upon resume, the first page of the RAM save partition is examined to determine whether the first page is still marked, in operation 610. As mentioned previously, the system can be brought out of sleep mode by a wake-up event, such as the user pressing on the power button or via the use of an attached keyboard or mouse. Depending on how long the system was idle, the system may resume from the S3 power state or the S4 power state. Examining the first page of the RAM save partition allows embodiments of the present invention determine which power state the system was in prior to resume.

A decision is made as to whether the first page of the RAM save portion is still marked, in operation 612. In one embodiment, the first page of the RAM save partition is filled with zeros to indicate the system has entered sleep mode. When the system resumes from sleep mode, the first page of the RAM save partition is examined to determine if it is still marked, that is contains all zeros, in the above embodiment. If the first page of the RAM save portion is still marked, the method 600 branches to operation 614. Otherwise, the method 600 continues to operation 616 to determine where the valid read cache data begins.

In operation 614, all the read cache data stored in the RAM save partition is determined to be valid and read caching can continue. Specifically, if the first page of the RAM save partition is still marked, the system has resumed from sleep mode but has not entered deep sleep mode. As a result, all the cached data located within the RAM save partition is still valid and can be utilized after resuming from sleep mode.

In operation 616, the RAM save partition is examined to determine where the valid cache data begins. If the system is not bought out of sleep mode after a predetermined period of time the system enters power state S4, which is deep sleep mode. In the S4 power state the contents of the RAM is saved to a non-volatile memory and power is tuned off completely in the system. The contents of the RAM is written to the RAM save partition of the dynamic cache memory starting at the first page of the RAM save partition. Thus, if the system enters deep sleep mode, the first page of the RAM save partition will be overwritten with RAM save data and will no longer contain the mark of operation 606. For example, in an embodiment where the first page is marked by writing all zeros to it, the first page of the RAM save partition will no contain all zeros if the system entered the S4 power state.

Once the starting address of the remaining valid read cache data is determined, normal read caching operation can continue. As described above, the starting address of the remaining valid read cache data is based on whether the first page of the RAM save partition is still marked. When the first page of the RAM save partition is still marked all the cached data in the RAM save partition is still valid and caching operations can continue as before power state S3 was entered. However, if the first page of the RAM save partition is not still marked, the RAM save partition is examined to determine where the valid read cache data begins, as described next with reference to FIG. 7.

Figure 7:
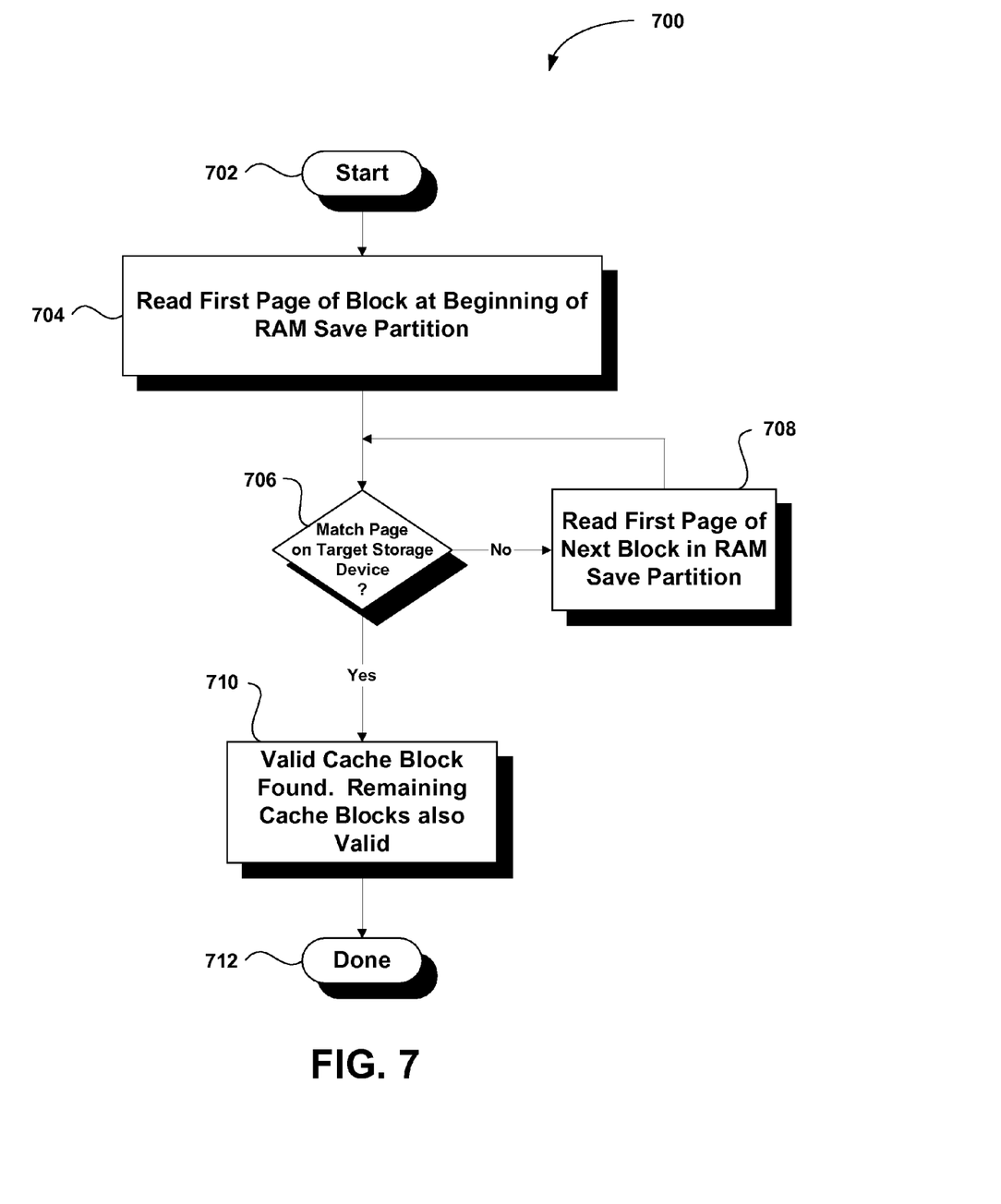
FIG. 7 is a flowchart showing a method for determining where valid read cache data begins in the RAM save partition after resuming from the S4 power state, in accordance with an embodiment of the present invention.

FIG. 7 is a flowchart showing a method 700 for determining where valid read cache data begins in the RAM save partition after resuming from the S4 power state, in accordance with an embodiment of the present invention. In an initial operation 702, preprocess operations are performed. Preprocess operations can include, for example, examining the first page of the RAM save partition after resume to determine whether deep sleep mode was entered, loading the RAM save file back into RAM, and other preprocess operations that will be apparent to those skilled in the art after a careful reading of the present disclosure.

In operation 704, the first page of the block at the beginning of the RAM save partition is examined to determine whether the block contains valid read cache data. When the system enters the deep sleep state, the contents of the RAM is saved to the RAM save partition as a RAM save file. However, the size of RAM save file is based on the current contents of the RAM at the moment the deep sleep state is entered. As such, if the entire contents of the RAM is not being utilized at the moment of deep sleep, the RAM save file will be smaller than the RAM save partition because the size of the RAM save partition is based on the entire capacity of the RAM. As a result, if the RAM save file is smaller than then RAM save partition, valid read cache data will remain in the RAM save partition after resume. Embodiments of the present invention find the remaining valid cache data by searching for a page match in the RAM save partition after resume. Hence, the first page of the block in the RAM save partition is compared against the contents in memory.

A decision is then made as to whether the page matches the corresponding page on the target storage device, in operation 706. If the page does not match the corresponding page on the target storage device, the method 700 branches to operation 708. Otherwise, the page matches the corresponding page on the target storage device and the method 700 continues to operation 710.

In operation 708, the first page of the next block in the RAM save partition is examined and compared to the corresponding page on the target storage device. If the page compare does not match, at least part of the block was overwritten by the RAM save file, and the block will be recycled. Thus, the method 700 continues to another compare operation 706 using the new page data.

In operation 710, valid read cache data has been found. When the page compare is a match, the block was not overwritten by the RAM save file and contains valid read cache data. Moreover, because the RAM save file is always written sequentially starting from the beginning of the RAM save partition, all the blocks after the matching block also include valid read cache data.

Read caching operation can continue, in operation 712, using the read cache data located in the general read cache partition and the valid read cache data remaining in the RAM save partition. The invalid read cache data in the RAM save partition can be discarded. In addition, the invalid read cache data portion of the RAM save partition can be repopulated.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for dynamic allocation of cache in a solid state drive environment, comprising:
    partitioning a cache memory into a reserved partition and a caching partition, wherein the reserved partition begins at a beginning of the cache memory and the caching partition begins after an end of the reserved partition;
    caching data starting at a beginning of the caching partition;
    caching data using the reserved partition when the caching partition is fully utilized;
    writing marking data to the reserve partition after receiving an indication of a power state change; and
    determining a beginning address within the reserve partition having valid cache data after resuming a normal power state.

2. A method as recited in claim 1, wherein the caching partition begins immediately after the reserved partition.

3. A method as recited in claim 1, further comprising examining the marking data after resuming a normal power state to determine whether a deep sleep power state was entered.

4. A method as recited in claim 1, further comprising examining a page of a data block in the reserve partition sequentially until valid cache data is found.

5. A method as recited in claim 4, wherein valid cache data is found when the page of data matches a corresponding page of data on a target storage device.

6. A method as recited in claim 1, wherein the marking data is all zeros.

7. A system for dynamic allocation of cache in a solid state drive environment, comprising:
    a central processing unit (CPU);
    a system memory in communication with the CPU;
    a target storage device in communication with the CPU;
    a dynamic caching device having a cache memory partitioned into a reserved partition and a caching partition, wherein the reserved partition begins at a beginning of the cache memory and the caching partition begins after an end of the reserved partition, wherein read data is cached starting at a beginning of the caching partition, and wherein read data is cached using the reserved partition when the caching partition is fully utilized, wherein marking data is written to the reserve partition after receiving an indication of a power state change, and wherein a beginning address within the reserve partition having valid cache data is determined after resuming a normal power state.

8. A system as recited in claim 7, wherein the caching partition begins immediately after the reserved partition.

9. A system as recited in claim 7, wherein the marking data is examined after resuming a normal power state to determine whether a deep sleep power state was entered.

10. A system as recited in claim 7, wherein a page of a data block in the reserve partition is examined sequentially until valid cache data is found.

11. A system as recited in claim 10, wherein valid cache data is found when the page of data matches a corresponding page of data on a target storage device.

12. A method for dynamic allocation of cache in a solid state drive environment, comprising:

partitioning a cache memory into a reserved partition and a caching partition, wherein the reserved partition begins at a beginning of the cache memory and the caching partition begins immediately after an end of the reserved partition;

caching data starting at a beginning of the caching partition;

caching data using the reserved partition when the caching partition is fully utilized;

writing marking data to the reserve partition after receiving an indication of a power state change;

examining the marking data after resuming a normal power state to determine whether a deep sleep power state was entered; and determining a beginning address within the reserve partition having valid cache data after resuming a normal power state.

13. A method as recited in claim 12, further comprising examining a page of a data block in the reserve partition sequentially until valid cache data is found.

14. A method as recited in claim 13, wherein valid cache data is found when the page of data matches a corresponding page of data on a target storage device.

15. A method as recited in claim 13, wherein the page of data is a first page of data of the data block.

16. A method as recited in claim 13, wherein invalid cache data within the reserved partition is repopulated after resuming a normal power state based on corresponding data stored on the target storage device.

17. A method as recited in claim 12, wherein the marking data is all zeros.

* * * * *